United States Patent
Chen et al.

(10) Patent No.: US 9,536,552 B1
(45) Date of Patent: Jan. 3, 2017

(54) RETAINING SLIDE-IN RAMP FOR HARD DISK DRIVE

(71) Applicant: Seagate Technology LLC, Cupertino, CA (US)

(72) Inventors: Jian J. Chen, Singapore (SG); Pow Hing Yong, Singapore (SG); Siew Ming Ng, Singapore (SG); Niroot Jierapipatanakul, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/815,899

(22) Filed: Jul. 31, 2015

(51) Int. Cl.
G11B 5/54 (2006.01)
G11B 5/127 (2006.01)

(52) U.S. Cl.
CPC .............. G11B 5/54 (2013.01); G11B 5/1272 (2013.01)

(58) Field of Classification Search
None
See application file for complete search history.

(56) References Cited

U.S. PATENT DOCUMENTS

| | | | |
|---|---|---|---|
| 5,148,339 A * | 9/1992 | Yoshida | G11B 5/54 360/254.7 |
| 5,486,964 A * | 1/1996 | Morehouse | G11B 21/12 360/255 |
| 5,875,074 A * | 2/1999 | Ho | G11B 5/54 360/254.9 |
| 6,057,987 A * | 5/2000 | Furay | G11B 5/4833 360/254.4 |
| 6,078,474 A | 6/2000 | Koyanagi et al. | |
| 6,344,950 B1 | 2/2002 | Watson et al. | |
| 6,449,128 B1 | 9/2002 | Abe | |
| 6,515,959 B1 * | 2/2003 | Fairchild | G11B 5/54 360/254.3 |
| 6,639,758 B2 | 10/2003 | Ohta et al. | |
| 7,268,972 B2 | 9/2007 | Akama et al. | |
| 7,474,509 B2 | 1/2009 | Antoku | |
| 7,551,402 B2 * | 6/2009 | Hayakawa | G11B 5/48 360/254.7 |
| 7,633,719 B2 | 12/2009 | Duvall et al. | |
| 7,672,083 B1 * | 3/2010 | Yu | G11B 5/54 360/254.4 |
| 7,697,238 B2 | 4/2010 | Makoto et al. | |
| 7,768,745 B2 | 8/2010 | Okada et al. | |
| 7,813,078 B1 | 10/2010 | Gleason et al. | |
| 7,986,496 B2 | 7/2011 | Ohta et al. | |
| 8,169,747 B2 | 5/2012 | Seki et al. | |
| 8,203,806 B2 | 6/2012 | Larson et al. | |
| 8,493,690 B1 | 7/2013 | Ono et al. | |
| 9,196,275 B1 * | 11/2015 | Davidson | G11B 5/54 |
| 2005/0018354 A1 | 1/2005 | Takahashi | |

(Continued)

*Primary Examiner* — Will J Klimowicz
(74) *Attorney, Agent, or Firm* — Taylor English Duma LLP (57) ABSTRACT

Examples of slide-in ramps for hard-disk drives are disclosed. In one example according to aspects of the present disclosure, a slide-in ramp includes: a ramp body, a head load/unload section connected to the ramp body, and a slot defined in the ramp body. The slot includes a first portion and a second portion. A first upper surface of the ramp body surrounds the first portion of the slot at a top side of the ramp body, and a second upper surface of the ramp body surrounds the second portion of the slot at the top side of the ramp body. The second upper surface is non-coplanar with the first upper surface according to various examples.

19 Claims, 5 Drawing Sheets

(56) References Cited

U.S. PATENT DOCUMENTS

| | | |
|---|---|---|
| 2005/0213254 A1* | 9/2005 | Okutomi .............. G11B 5/54 360/254.8 |
| 2005/0237671 A1 | 10/2005 | Nguyen |
| 2006/0256478 A1 | 11/2006 | Hayakawa |
| 2008/0285175 A1 | 11/2008 | Okutomi et al. |
| 2008/0285176 A1 | 11/2008 | Arikawa |
| 2009/0290258 A1* | 11/2009 | Matsuda .............. G11B 21/22 360/130.2 |
| 2010/0061012 A1 | 3/2010 | Seki et al. |
| 2012/0075750 A1 | 3/2012 | Chan et al. |

\* cited by examiner

RETAINING SLIDE-IN RAMP FOR HARD DISK DRIVE

SUMMARY

The present disclosure relates to technologies for slide-in ramps for a hard-disk drive ("HDD") device. According to some examples, a slide-in ramp includes a ramp body. A slot having a first portion and a second portion is defined in the ramp body. A first upper surface of the ramp body surrounds the first portion of the slot at a top side of the ramp body. A second upper surface of the ramp body surrounds the second portion of the slot at the top side of the ramp body. According to some examples, the second upper surface is non-coplanar with the first upper surface.

According to further examples, a method includes positioning a slide-in ramp in a HDD device. The slide-in ramp includes a ramp body, a head load/unload section connected to the ramp body, a slot defined in the ramp body according to some examples. According to some examples, the slot includes a first portion and a second portion. A first upper surface of the ramp body surrounds the first portion of the slot at a top side of the ramp body, a second upper surface of the ramp body surrounds the second portion of the slot at the top side of the ramp body. According to some examples, a lip is defined between the first upper surface and the second upper surface. According to some examples, the method includes inserting a screw in the first portion of the slot.

According to further examples, a system includes a slide-in ramp and a screw. The slide-in ramp includes a ramp body. A slot having a first portion and a second portion is defined in the ramp body. A first upper surface of the ramp body surrounds the first portion of the slot at a top side of the ramp body. A second upper surface of the ramp body surrounds the second portion of the slot at the top side of the ramp body. According to some examples, a lip is defined between the first upper surface and the second upper surface. According to some examples, the screw is positioned in the slot.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

The following detailed description is directed to technologies for ramps for a hard-disk drive ("HDD") device. The HDD device is a type of data storage device that is used with various electronic equipment such as personal computers (PCs), televisions, digital video recorders (DVRs), and various other equipment. During use of the HDD device, a magnetic-recording head writes data to and reads data from a magnetic-recording medium of a magnetic-recording via the magnetic-recording head. When the HDD device is not in use, a load/unload ramp structure may be utilized to hold the magnetic-recording head away from the magnetic-recording medium to prevent damage to the magnetic-recording medium.

A type of ramp structure used with HDD devices is a slide-in ramp. Disclosed is a slide-in ramp and associated methods, systems, devices, and various apparatus. No particular terminology or description should be considered limiting on the disclosure or the scope of any claims issuing therefrom. As used herein, directional references such as "up," "down," "top," "left," "right," "front," "back," "upper," "lower," "lateral" and "corners," among others are intended to refer to the orientation as illustrated and described in the figure (or figures) to which the components and directions are referencing.

Figure 1:
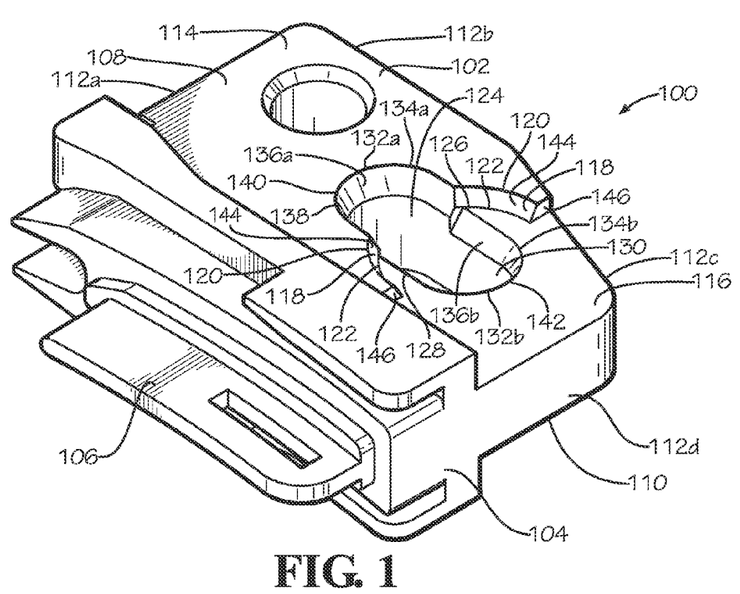
FIG. 1 illustrates a perspective view of a slide-in ramp according to examples of the present disclosure.

One example of a slide-in ramp 100 is disclosed and described in FIG. 1. The slide-in ramp 100 includes a body 102 and a head load/unload section 104. In various examples, the body 102 and head load/unload section 104 are monolithically formed. For example, the body 102 and head load/unload section 104 may be formed through a one-shot molding technique, in which the body 102 and head load/unload section 104 are concurrently constructed. The body 102 and head load/unload section 104 may be constructed from the same type of material. In various examples, the body 102 and head load/unload section 104 may be constructed from materials such as copolyesters of 4-hydroxybenzoic acid and 6-hydroxy-2-naphthoic acid (HAHN), polyetheretherketone (PEEK), polyimide, polyacetals, polytetrafluoroethylene (PTFE) filled plastics, and various other materials suitable for slide-in ramps such as various polymers, metals, alloys, ceramics, and various other materials. In various examples, forming the slide-in ramp 100 through the one-shot molding technique may reduce the monetary and time cost required for manufacturing the slide-in ramp 100. However, the disclosure the one-shot molding technique to form the slide-in ramp 100 should not be considered limiting on the current disclosure as in various other examples, various other molding techniques may be utilized to form the slide-in ramp 100. For example, in various other examples, a multi-step molding technique may be utilized such as a two-shot molding technique. In various other examples, the body 102 may be constructed from a first type of material and the head load/unload section 104 may be constructed from a second type of material.

The head load/unload section 104 includes a ramp unit 106 in various examples. At the end or termination of normal operation of a HDD device (not illustrated), various magnetic-recording heads (not illustrated) of the HDD device are parked on the ramp unit 106 of the head load/unload section 104. The number of ramp units 106 should not be considered limiting on the current disclosure as in various other examples, the head load/unload section 104 may have any desired number of ramp units 106. In addition, the shape, configuration, or design of the ramp unit 106 or the head load/unload section 104 should not be considered limiting on the current disclosure as in various other examples, the ramp unit 106 or the head load/unload section 104 may have any desired shape, configuration, or design.

The body 102 of the slide-in ramp 100 includes a top side end 108, a bottom side end 110, and lateral side ends 112a,b,c,d. As illustrated in FIG. 1, the lateral side ends 112a,b,c,d define a profile shape for the body 102. The number of lateral side ends 112 should not be considered limiting on the current disclosure as in various other examples, any desired number of lateral side ends 112 may be utilized. In addition, the profile shape of the body 102, as defined by the lateral side ends 112, should not be considered limiting on the current disclosure as in various other examples, the body 102 may have any desired profile shape.

According to various examples, the body 102 includes a first upper surface 114 and a second upper surface 116 at the top side end 108. In various examples, a distance from the bottom side end 110 to the second upper surface 116 is less than a distance from the bottom side end 110 to the first upper surface 114. As illustrated in FIG. 1, in various examples, the second upper surface 116 is recessed into the body 102 relative to the first upper surface 114 such that the first upper surface 114 is non-coplanar with the second upper surface 116.

In various examples, a lip 118 is defined between the first upper surface 114 and the second upper surface 116. As illustrated in FIG. 1, in various examples, the lip 118 is a surface extending between the first upper surface 114 and the second upper surface 116. In various examples, the lip 118 includes a first type of surface for a first portion of the lip 118 and another portion of the lip 118 may be a second type of surface. In the present example, the lip 118 includes a tapered surface 144 and a lateral surface 146 extending between the first upper surface 114 and the second upper surface 116; however, the disclosure of the surfaces 144,146 should not be considered limiting on the current disclosure as in various other examples, the lip 118 may include angled surfaces, curved surfaces, radiused surfaces, arcuate surfaces, lateral surfaces, or any other desired type of surface between the first upper surface 114 and the second upper surface 116. In various other examples, as illustrated, for example, in FIG. 9, the lip 118 may include a single type of surface extending between the first upper surface 114 and the second upper surface 116.

As illustrated in FIG. 1, in various examples, the lip 118 includes a top edge 120 and a bottom edge 122. According to various examples, the top edge 120 and the bottom edge 122 are arcuate-shaped. In various other examples, the edges 120, 122 may have any desired shape. In various examples, the top edge 120 and the bottom edge 122 are shaped and dimensioned such that a screw head 656 of a screw 654 (illustrated in FIG. 5) positioned in the slot 124 engages the lip 118 and secures the screw 654 in a desired position within the slot 124, as described in greater detail below.

In various examples, the lip 118 extends from a first side 126 of a slot 124 defined in the body 102. The lip 118 also extends from a second side 128 of the slot 124 according to various examples. In the present example, the lip 118 extends from the first side 126 to the lateral side end 112c and extends from the second side 128 to the head load/unload section 104. Accordingly, in various examples, the first upper surface 114 extends between the lateral side end 112a, the lateral side end 112b, the lateral side end 112c, the head load/unload section 104, and the lip 118. Additionally, in various examples, the second upper surface 116 extends between the lateral side end 112c, the lateral side end 112d, the head load/unload section 104, and the lip 118. In various examples, the lip 118 may have any desired shape. The lip 118 may also have any desired design in various examples and may extend from the first side 126 around a front end 140 or a back end 142 of the slot 124 to the second side 128, extend from the sides 126,128 to any of the lateral side ends 112 of the body 102, or have any other desired design. For example, as described in greater detail below with reference to FIG. 9, in various other examples, the lip 118 may not extend to any of the lateral side ends 112 or to the head load/unload section 104 but instead may extend around the slot 124 from the first side 126 to the second side 128.

As illustrated in FIG. 1, according to various examples, the body 102 defines the slot 124. The slot 124 includes the front end 140, the back end 142, the first side 126, and the second side 128. In various examples, the slot 124 extends through the body 102 from the top side end 108 to the bottom side end 110. The slot 124 defines an inner slot surface 130 between the top side end 108 and the bottom side end 110 of the body 102.

In various examples, the slot 124 includes a first slot portion 134a and a second slot portion 134b. According to various examples, the first slot portion 134a is the portion of the slot 124 including the front end 140. The first slot portion 134a defines a first top slot opening 132a in the first upper surface 114. As illustrated in FIG. 1, the first upper surface 114 surrounds the first slot portion 134a at the top side 108 of the body 102. The second slot portion 134b is the portion of the slot 124 including the back end 142. The second slot portion 134b defines a second top slot opening 132b in the second upper surface 116. As illustrated in FIG. 1, the second upper surface 116 surrounds the second slot portion 134b at the top side 108 of the body 102. In various examples, the lip 118 intersecting the first side 126 and the second side 128 of the slot 124 separates the first slot portion 134a from the second slot portion 134b.

Together, the first top slot opening 132a and the second top slot opening 132b define a continuous top slot opening 138 at the top side end 108. According to various examples, the slot 124 also includes a bottom slot opening 450 (illustrated in FIG. 4) at the bottom side end 110. As illustrated in FIG. 1, in various examples, the slot 124 has an oblong shape such that a distance from the front end 140 to the back end 142 is greater than a distance from the first side 126 to the second side 128. In various examples, the oblong shape enables a sliding function of the slide-in ramp 100 during installation of the slide-in ramp 100.

In various examples, each slot portion 134a,b of the slot 124 includes a guide surface 136a,b, respectively, between the top slot openings 132a,b and the inner slot surface 130.

In various examples, each guide surface 136a,b is a tapered surface; however, the type of surface of the guide surfaces 136 should not be considered limiting on the current disclosure as in various other examples, the guide surfaces 136 may be any desired type of surface. In various other examples, the guide surfaces 136a,b between the top slot openings 132a,b and the inner slot surface 130 may be omitted.

Figure 2:
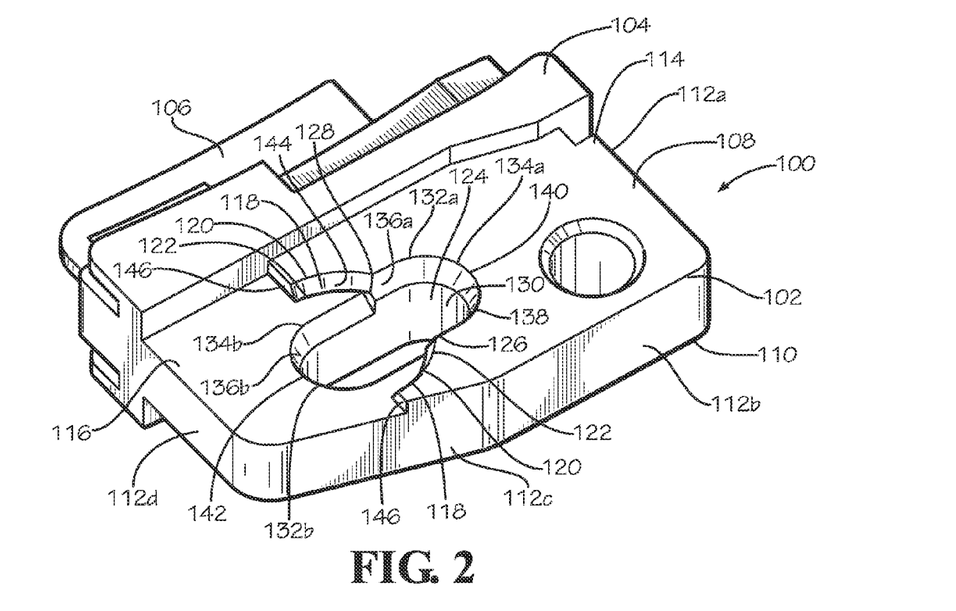
FIG. 2 illustrates another perspective view of the slide-in ramp of FIG. 1 according to examples of the present disclosure.

FIG. 2 illustrates another perspective view of the slide-in ramp 100. As illustrated in FIG. 2, the lip 118 extends from the second side 128 of the slot 124 to the head load/unload section 104. Similar to the portion of the lip 118 between the first side 126 and the lateral side end 112c, the portion of the lip 118 between the second side 128 and the head load/unload section 104 includes the tapered surface 144 and the lateral surface 146.

Figure 3:
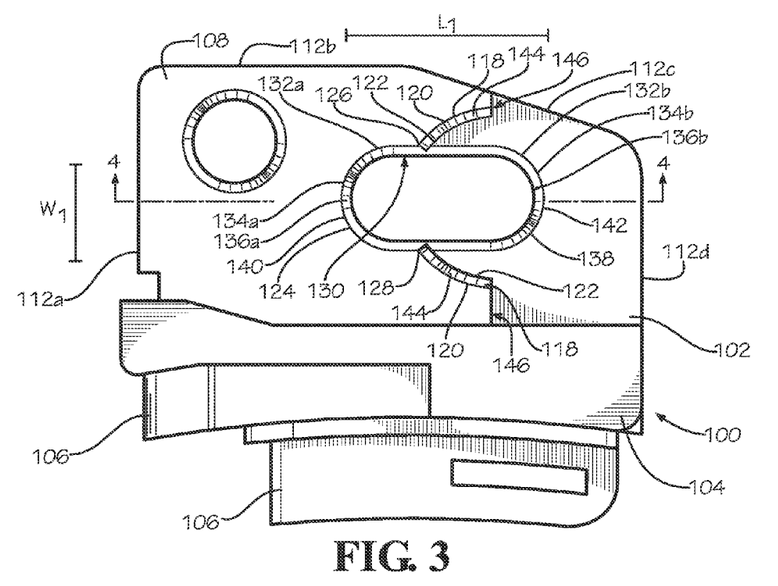
FIG. 3 illustrates a top view of the slide-in ramp of FIG. 1 according to examples of the present disclosure.

FIG. 3 illustrates a top view of the slide-in ramp 100. As illustrated in FIG. 3, the slot 124 has an oblong shape, which enables a sliding function of the slide-in ramp 100 during installation or uninstallation of the slide-in ramp 100. According to various examples, the slot 100 has an oblong shape and a length $L_1$ of the slot 124, which is defined as a distance from the front end 140 to the back end 142, is greater than a width $W_1$ of the slot 124, which is defined as a distance from the first side 126 to the second side 128. In the present example, the slot 124 is oval-shaped; however, the shape of the slot 124 should not be considered limiting on the current disclosure as in various other examples, the slot 124 may be any desired oblong shape.

Figure 4:
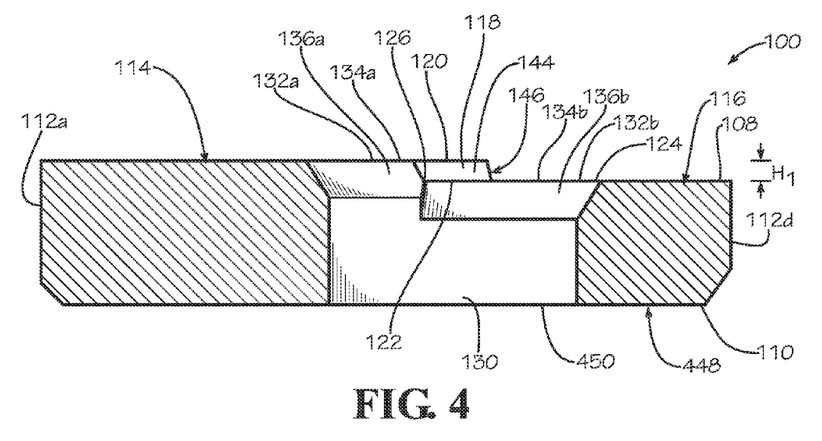
FIG. 4 illustrates a cross-sectional view of the slide-in ramp taken along line 4-4 in FIG. 3 according to examples of the present disclosure

FIG. 4 illustrates a cross-sectional view of the slide-in ramp 100 taken along line 4-4 in FIG. 3. As illustrated in FIG. 4, the body 102 includes a lower surface 448 at the bottom side end 110. According to various examples, the slot 124 defines the bottom slot opening 450 in the lower surface 448 at the bottom side end 110. As illustrated in FIG. 4, in various examples, the slot 124 extends from the top side end 108 to the bottom side end 110. As illustrated in FIG. 4, the first upper surface 114 is non-coplanar with the second upper surface 116. In various examples, the lip 118 has a height $H_1$, which is the difference between a distance from the lower surface 448 to the first upper surface 114 and a distance from the lower surface 448 to the second upper surface 116. According to various examples, the height $H_1$ of the lip 118 is a sufficient height to engage the screw 654 (illustrated in FIG. 5) and retain the screw 654 in an installed position, as described in greater detail below.

Figure 5:
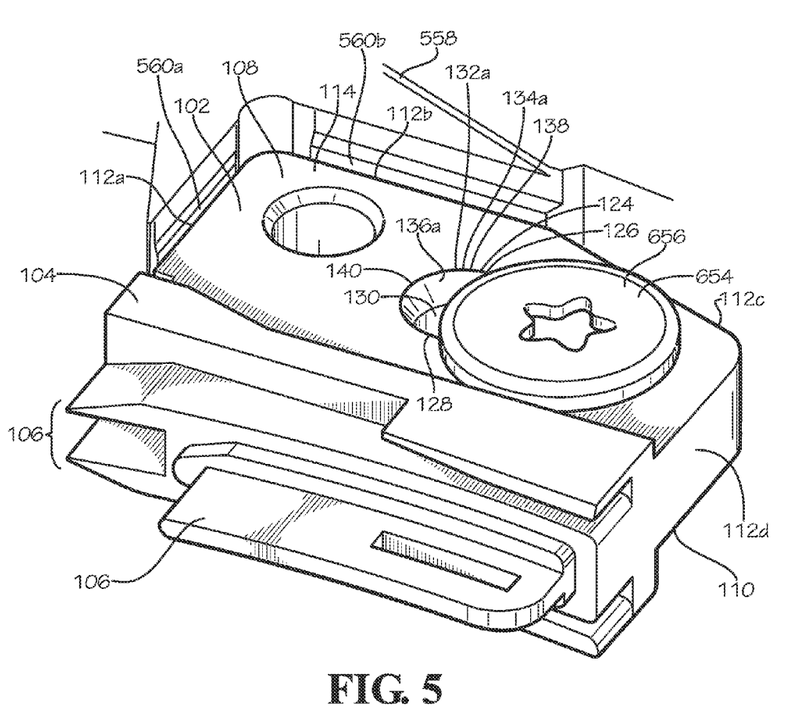
FIG. 5 illustrates a perspective view of the slide-in ramp of FIG. 1 and a securing mechanism with the slide-in ramp positioned against datum planes of a hard disk drive according to examples of the present disclosure.

FIGS. 5-8 illustrate the slide-in ramp 100 with a securing mechanism positioned in the slot 124. In various examples, the securing mechanism is the screw 654 having the screw head 656. However, the disclosure of the screw 654 as the securing mechanism should not be considered limiting on the current disclosure as in various other examples, various other securing mechanisms may be utilized. As illustrated in FIG. 5, according to various examples, the screw 654 is positioned in the slot 124. In various examples, the screw 654 is utilized to secure the slide-in ramp 100 in place after the slide-in ramp 100 is moved to a desired position within a HDD device 558 (partially illustrated in FIG. 5). In various examples, the slide-in ramp 100 is positioned against datum planes 560a,b such that the position of the screw 654 and the positioning of the slide-in ramp 100 against the datum plates 560a,b, respectively, retain the slide-in ramp 100 in a desired position.

Figure 6:
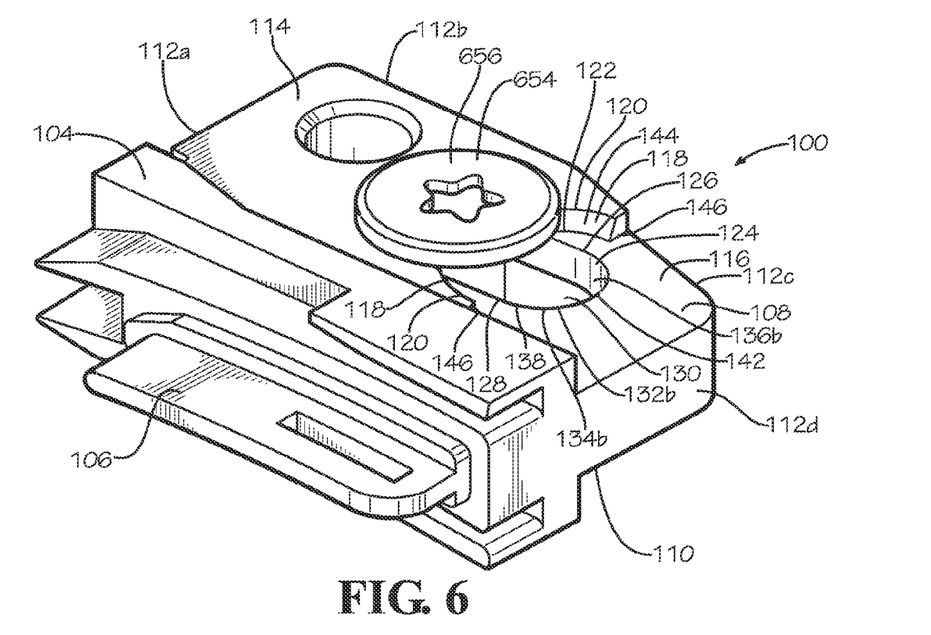
FIG. 6 illustrates another perspective view of the slide-in ramp and securing mechanism of FIG. 5 in a pre-installed position according to examples of the present disclosure.

FIG. 6 illustrates the slide-in ramp 100 and screw 654 in a pre-installed position. In the pre-installed position, the slide-in ramp 100 is not at a desired position within the HDD device. According to various examples, in the pre-installed position, the screw 654 is positioned in the slot 124 in the first slot portion 134a and proximate to the front end 140. In the pre-installed position, the first upper surface 114 is a screw-sitting surface and the screw head 656 may engage the first upper surface 114. However, in various examples, in the pre-installed position, the screw head 656 need not engage the first upper surface 114.

Figure 7:
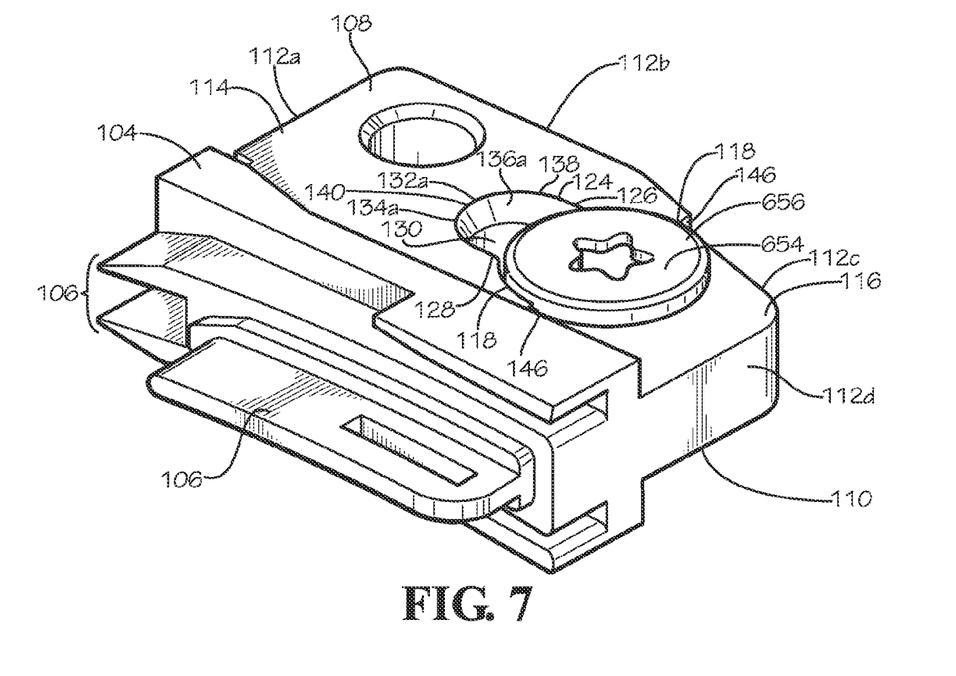
FIG. 7 illustrates a perspective view of the slide-in ramp and securing mechanism of FIG. 5 in an installed position according to examples of the present disclosure.

FIG. 7 illustrates the slide-in ramp 100 and screw 654 in an installed position. In the installed position, the slide-in ramp 100 is slid and moved into a desired position within the HDD device. Because the position of the slide-in ramp 100 is changed, the position of the screw 654 is also changed within the slot 124. In various examples, in the installed position, the screw 654 is positioned in the second slot portion 134b and proximate to the back end 142. In the installed position, the second upper surface 116 is the screw-sitting surface and the screw head 656 may engage the second upper surface 116. Tightening of the screw 654 by a user such that the screw head 656 engages the second upper surface 116 may aid in retaining the slide-in ramp 100 in the installed position. In various embodiments, tightening of the screw 654 slides the slide-in ramp 100 such that the screw 654 is positioned in the second slot portion 134b of the slot 124 and is engaged with the lip 118.

According to various examples, because the second upper surface 116 is recessed and non-coplanar with the first upper surface 114, in the installed position, the screw head 656 also engages the lip 118 between the second upper surface 116 and the first upper surface 114. In various examples, the top edge 120 and the bottom edge 122 of the lip 118 are dimensioned and shaped such that the lip 118 engages the screw head 656, moves the screw head 656 into the installed position as the screw 656 is tightened, and retains the screw 654 in the installed position. The user may tighten the screw head 656 such that the screw head 656 engages the lip 118 and retains the screw head 656 in the second slot portion 134b. Accordingly, the slide-in ramp 100 is retained in the installed position. In various examples, the screw head 656 engages at least at a portion of the lip 118 adjacent to the sides 126,128 of the slot 124. In various other examples, the screw head 656 may also engage other portions of the lip 118 at portions other than the portion of the lip 118 adjacent to the sides 126,128 of the slot 124. The engagement of the screw head 656 with the lip 118 provides secure and precise positioning of the slide-in ramp 100. According to various examples, the slide-in ramp 100 may also engage datum planes 560 illustrated in FIG. 6 in the installed position. The lip 118 engaging the screw head 656 and the body 102 engaging the datum planes together may limit unwanted rotation or displacement of the slide-in ramp 100.

Figure 8:
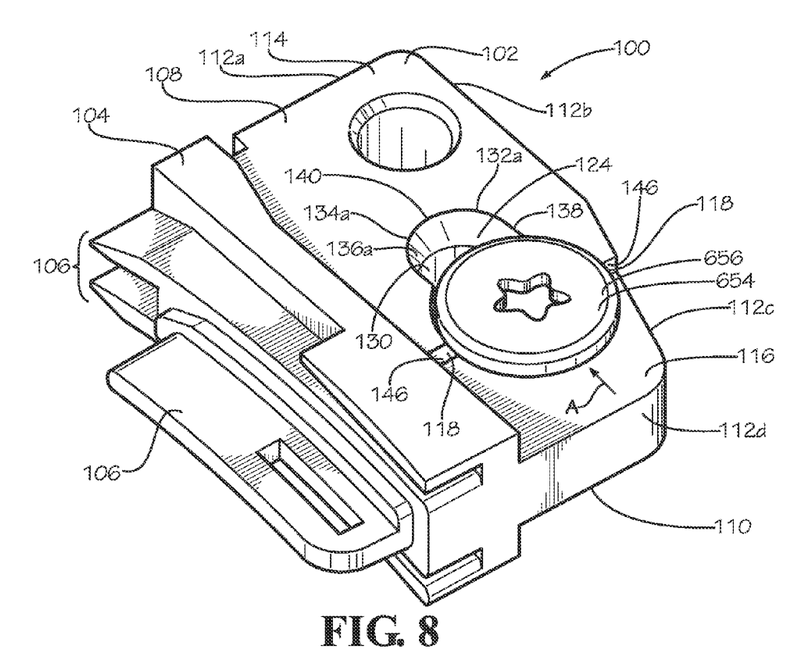
FIG. 8 illustrates another perspective view of the slide-in ramp and securing mechanism of FIG. 5 in the installed position according to examples of the present disclosure.

As illustrated in FIG. 8, the lip 118 engaging the screw head 656 acts against a displacement force acting on the screw 656, such as the force indicated by arrow A, and the screw 654 is retained in the installed position. In various examples, the force A acts upon the screw 654 in various situations during use of the HDD device. For example, screw torque may drop after a thermal shock that may occur in the HDD device during use, and because the screw torque drops in such situations, the slide-in ramp 100 may be subject to displacement forces. However, in such situations, the screw head 656 engaging the lip 118 retains the slide-in ramp 100 in place and prevents displacement of the slide-in ramp 100 despite the drop in screw torque. The disclosure of the screw torque drop should not be considered limiting on the current disclosure as in various other examples, various other situations may arise during HDD device use where the slide-in ramp 100 is subject to displacement forces.

According to various examples, the user may return the slide-in ramp 100 to the pre-installed position by untightening the screw 654 such that the screw head 656 no longer engages the lip 118. The user is able to move the slide-in ramp 100 relative to the screw 654 within the slot 124 such that the screw 654 is positioned proximate to the front end 140 because the screw head 656 does not engage the lip 118.

Figure 9:
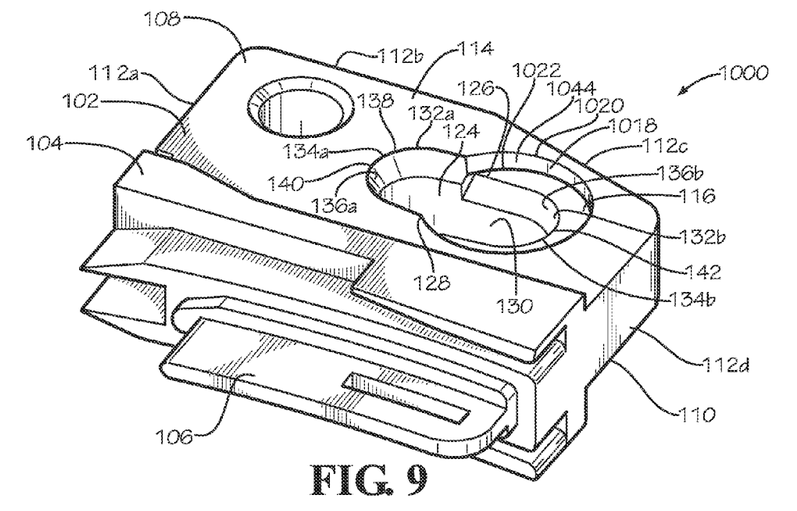
FIG. 9 illustrates a perspective view of another example of a slide-in ramp according to examples of the present disclosure.

FIG. 9 illustrates another example of a slide-in ramp 1000 according to various examples of the current disclosure. Similar to the slide-in ramp 100, the slide-in ramp 1000 includes a body 102 and the head load/unload section 104, which includes the ramp unit 106. Similar to the body 102, the body 102 includes a top side end 108, the bottom side end 110, and the lateral side ends 112a,b,c,d and defines the slot 124 extending through the body 102 from the top side end 108 to the bottom side end 110.

According to various examples, the body 102 includes a first upper surface 114 and a second upper surface 116 at the top side end 108. As illustrated in FIG. 9, similar to the first upper surface 114 and the second upper surface 116, in various examples, the second upper surface 116 is recessed into the body 102 relative to the first upper surface 114 such that the first upper surface 114 is non-coplanar with the second upper surface 116. As illustrated in FIG. 9, in various examples, the first upper surface 114 surrounds the second upper surface 116 such that the second surface 116 is defined between the first upper surface 114 and the second portion 134b of the slot 124.

In various examples, a lip 1018 is defined between the first upper surface 114 and the second upper surface 116. The lip 1018 is similar to the lip 118 and is a surface extending between the first upper surface 114 and the second upper surface 116. Unlike the lip 118, the lip 1018 includes a single type of surface defined between the first upper surface 114 and the second upper surface 116. In the present example, the lip 1018 is a tapered surface 1044; however, the disclosure of the tapered surfaces should not be considered limiting on the current disclosure as in various other examples, the lip 1018 may include angled surfaces, curved surfaces, arcuate surfaces, lateral surfaces, or any other desired type of surface between the first upper surface 114 and the second upper surface 116.

The lip 1018 includes a top edge 1020 and a bottom edge 1022, which are similar to the top edge 120 and the bottom edge 122. As illustrated in FIG. 9, in various examples, the lip 1018 extends from the first side 126 of the slot 1024, around the back end 142 of the slot 124, and to the second side 128 of the slot 124. In various examples, the lip 1018 extending from the first side 126 to the second side 128 defines a profile of the lip 1018. In various examples, the profile of the lip 1018 defines a shape of the second upper surface 116. In various examples, the lip 1018 has an oblong shaped profile and the second upper surface 116 has an oblong shape; however, the disclosure of the shape of the profile of the lip 1018 or the shape of the second upper surface 116 should not be considered limiting on the current disclosure as in various other examples, the lip 1018 or second upper surface 116 may have any desired shape. The profile of the lip 1018 where the lip 1018 intersects the sides 126,128 of the slot 124 are dimensioned such that the screw head 656 of the screw 654 (not illustrated) engages the lip 1018 and retains the screw 654 in the installed position. According to various examples, the screw head 656 engages the lip 1018 at the sides 126,128 of the slot 124 in the installed position. According to various examples, the screw head 656 may or may not engages the remaining portion of the lip 1018 not intersecting the sides 126,128 of the slot 124.

One should note that conditional language, such as, among others, "can," "could," "might," or "may," unless specifically stated otherwise, or otherwise understood within the context as used, is generally intended to convey that certain examples include, while other examples do not include, certain features, elements and/or steps. Thus, such conditional language is not generally intended to imply that features, elements and/or steps are in any way required for one or more particular examples or that one or more particular examples necessarily include logic for deciding, with or without user input or prompting, whether these features, elements and/or steps are included or are to be performed in any particular example.

It should be emphasized that the above-described examples are merely possible examples of implementations, merely set forth for a clear understanding of the principles of the present disclosure. Many variations and modifications may be made to the above-described example(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A slide-in ramp comprising:
a ramp body;
a head load/unload section connected to the ramp body;
a slot defined in the ramp body, the slot including a first portion and a second portion, a first upper surface of the ramp body surrounding the first portion of the slot at a top side of the ramp body, and a second upper surface of the ramp body surrounding the second portion of the slot at the top side of the ramp body, the second upper surface being non-coplanar with the first upper surface; and
a lip defined by the ramp body between the first upper surface and the second upper surface, the lip having an arcuate shape configured to secure the slide-in ramp axially and rotationally by engaging a screw installed in the second portion of the slot, wherein the slot has a slot width and a slot length, wherein the slot length is greater than the slot width, and wherein the slot length extends in a direction substantially parallel to the head load/unload section.

2. The slide-in ramp of claim 1, wherein the slide-in ramp is monolithically formed.

3. The slide-in ramp of claim 1, wherein the lip extends from a side of the slot to an end of the ramp body.

4. The slide-in ramp of claim 1, wherein the lip extends from a first side of the slot to a second side of the slot, and wherein the first upper surface surrounds the second upper surface.

5. The slide-in ramp of claim 1, wherein the lip is a tapered surface extending between the first upper surface and the second upper surface.

6. The slide-in ramp of claim 1, wherein the first upper surface extends from a first end of the ramp body to the lip between the first upper surface and the second upper surface and wherein the second upper surface extends from a second end of the ramp body to the lip.

7. The slide-in ramp of claim 1, wherein the second upper surface is recessed into the ramp body relative to the first upper surface.

8. The slide-in ramp of claim 1, wherein the lip is shaped complimentary to a radius of curvature of a screw head of the screw.

9. A method comprising:
positioning a slide-in ramp in a hard disk drive device, the slide-in ramp including
a ramp body,
a head load/unload section connected to the ramp body,
a slot defined in the ramp body, the slot including a first portion and a second portion, a first upper surface of the ramp body surrounding the first portion of the slot at a top side of the ramp body, a second upper surface of the ramp body surrounding the second portion of the slot at the top side of the ramp body, and
a lip defined between the first upper surface and the second upper surface;
inserting a screw in the first portion of the slot; and
sliding the slide-in ramp such that the screw is positioned in the second portion of the slot and engaged with the lip.

10. The method of claim 9, wherein sliding the slide-in ramp includes contacting the ramp body with a datum plane of the hard disk drive device such that the lip and the datum plane hold the screw in place in the second portion of the slot.

11. The method of claim 9, wherein tightening of the screw slides the slide-in ramp such that the screw is positioned in the second portion of the slot and engaged with the lip.

12. The method of claim 9, wherein the lip is a tapered surface extending between the first upper surface and the second upper surface, wherein the lip engaged with the screw holds the screw in place in the second portion of the slot.

13. The method of claim 9, the second upper surface is recessed into the ramp body relative to the first upper surface.

14. A system comprising:
a screw comprising a screw head;
a slide-in ramp, the slide-in ramp including
a ramp body,
a head load/unload section connected to the ramp body,
a slot defined in the ramp body, the slot including a first portion and a second portion, a first upper surface of the ramp body surrounding the first portion of the slot at a top side of the ramp body, a second upper surface of the ramp body surrounding the second portion of the slot at the top side of the ramp body, the screw positioned in the slot, and
a lip defined between the first upper surface and the second upper surface, the lip shaped complimentary to a radius of curvature of the screw head, the lip engaging the screw head and securing the slide-in ramp relative to the screw when the screw is installed in the second portion of the slot.

15. The system of claim 14, wherein:
in a pre-installed position, the screw is positioned in the first portion of the slot proximate to a front end of the slot; and
in an installed position, the screw is positioned in the second portion of the slot proximate to a back end of the slot.

16. The system of claim 15, wherein the lip extends from a side of the slot to an end of the ramp body, and wherein in the installed position, a screw head of the screw is engaged with the lip such that the lip holds the screw in place in the second portion of the slot in the installed position.

17. The system of claim 15, wherein the lip extends from a first side of the slot to a second side of the slot, wherein the first upper surface surrounds the second upper surface, and wherein in the installed position, a screw head of the screw is engaged with the lip at the first side of the slot and at the second side of the slot such that the lip holds the screw in place in the second portion of the slot in the installed position.

18. The system of claim 14, wherein in the installed position, a portion of the screw head is positioned below the first upper surface of the ramp body.

19. The system of claim 14, wherein the second upper surface is recessed into the ramp body relative to the first upper surface.

* * * * *